June 12, 1956   W. R. SMITH ET AL   2,750,559
AVAILABLE EMISSION TESTER
Filed June 29, 1953

INVENTORS
ROGER W. SLINKMAN
WILSON R. SMITH
BY Michael Hertz
ATTORNEY

United States Patent Office 2,750,559
Patented June 12, 1956

2,750,559

AVAILABLE EMISSION TESTER

Wilson R. Smith, Reading, Mass., and Roger W. Slinkman, Emporium, Pa., assignors to Sylvania Electric Products Inc., a corporation of Massachusetts Application June 29, 1953, Serial No. 364,786

8 Claims. (Cl. 324—27)

This invention relates to emission testing.

One of the important characteristics of an electron tube is the amount of electronic emission obtained from the cathode. In the past, various methods have been employed to measure the emission. In a common method, all of the elements except the cathode and heater, if any, are connected together, the tube is heated to a fairly stable operating condition and a constant voltage is applied between the cathode and the other electrodes. Then the current flow through the circuit or the voltage drop across a resistor in the circuit is measured to determine the conductivity of the tube under those conditions. These tests are made at a point well below emission saturation and nothing is ascertained thereby as to the characteristics of the tube at or beyond saturation. With the use of steady currents it is not feasible to carry on tests at or beyond the saturation point since to do so would cause excessive heating of the tube, gassification thereof and its ruin. Furthermore, even were the tube not completely ruined, the gassification brought about by the excessive heating soon would cause deterioration to the emissive properties of the cathode coating with consequent drop in emission whereby consecutive readings at or above the saturation knee would give variable results.

So, for ascertaining more accurately the emission characteristics of a tube, there have been evolved various complex circuits for applying only a momentary high energy pulse or pulses to the tube, these pulses being infrequent enough to allow for heat dissipation between the pulses sufficient to prevent tube deterioration.

A method of determining emissive characteristics of a tube would be to subject it to an emission voltage of triangular shape so the form and shape of the emission current vs. emission voltage curve may be ascertained and studied.

It is an object of this invention to make such a tester of simple and inexpensive construction.

It is a further object of this invention to provide a tester which shall respond to pulses at selected cycles apart to give various time intervals between initiations of tube conducting periods while yet maintaining the tube conducting period at a constant value, as will be understood after reading the specification.

Other objects will appear after reading the following detailed description and claims, together with the accompanying drawings in which Fig. 1 is a wave form of interest in considering the pulses applied to a tube under test.

Figure 5:
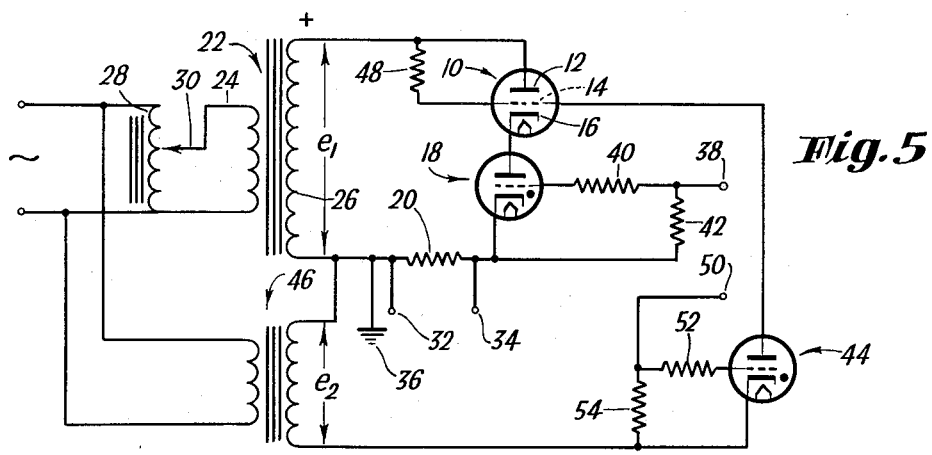
Fig. 5 is a circuit diagram of salient portions of the emission tester.

Referring to Fig. 5 of the drawings, the tube under test is indicated at 10. For purposes of exemplification only this tube is shown as a triode. Other types of tubes may be tested as will be obvious from further reading of the specification. The triode comprising an anode 12, control grid 14 and cathode 16 is placed in series relation with a gas filled tube 18, there being a resistor 20 in series with the two tubes. Supplying an A. C. voltage to the series connected elements is a transformer 22 having a primary winding 24 and a high voltage secondary winding 26. The primary winding may have a variable voltage applied to it by interposition of an autotransformer 28 between tthe A. C. supply and the transformer 22, the autotransformer being equipped with a contact arm 30 movable along autotransformer turns to furnish the desired voltage to the transformer 22. Connected to the ends of the resistor 20 are two terminals 32 and 34 to which may be applied any suitable voltage indicating or measuring instrument such as an oscilloscope with a long persistency screen. The terminal 32 may be grounded as indicated at 36. The gas filled tube 18 may be triggered by application of a triggering pulse at terminal 38. A resistance 40 is inserted in the grid supply to the tube to limit grid current to a safe value, after the tube is fired. A second resistor 42 is connected between the triggering terminal 38 and the cathode of the tube 18 for the purpose of preventing the grid from floating, and therefore from firing haphazardly due to electrostatic conditions or otherwise.

A second gas filled tube 44 is connected in between the grid of the tube 10 under test and the secondary of a second transformer 46, the primary of which is connected to the same source as feeds the transformer 22. The secondaries of the transformers are both connected in a series aiding manner with their interconnection connected to the common terminal 32 or ground. Current will flow through the gas filled tube 44 when it is triggered to fire. To limit the current flow through the tube 44, a resistor 48 is interposed between the upper end of transformer secondary 26 and the anode of tube 44. The resistor 48 also serves to connect the grid and anode of the tube under test. The tube 44 may be triggered by applying a pulse to the terminal 50. Resistances 52 and 54 are employed for the reasons pointed out in connection with the description of resistances 40 and 42.

Figure 1:
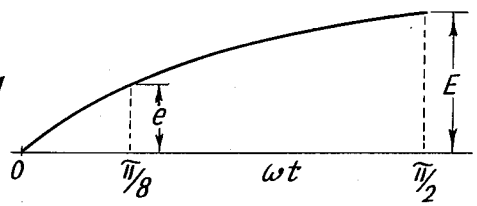
Figure 2:
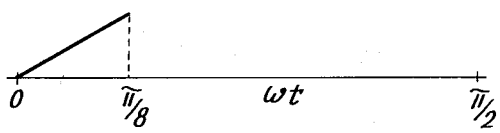
Fig. 2 is a representation of a saw tooth pulse as applied to electrodes of the tube under test.

Now referring to Fig. 1, and considering the curve to be a sine curve, then $$e = E \sin \omega t$$

where $e$ is the instantaneous voltage
$E$ is the maximum voltage
$\omega$ is $2\pi$ times the frequency, and
$t$ is the elapsed time The portion of the curve between 0 and $\pi/8$ is substantially linear with respect to time. If the gas filled tube 18 be triggered when $\omega t=0$, that is when the voltage curve is just beginning on its positive swing, current will flow through the series arrangement of the tube 10 under test, the tube 18 and the resistor 20. If the tube 18 be conductive between the limits $0 < \omega t < \pi/8$, the voltage increase is reasonably linear with time as shown in optimum form in Fig. 2. During this time the amplitude of the voltage waveform across the resistor 20 will increase with $e$ as long as space charge operation of tube 10 occurs. When the transition is made to saturation of tube 10 as determined by the temperature within the tube, the voltage amplitude across the resistor 20 will be approximately constant with increasing voltage $e$. With this transition in the waveform across the resistor 20 occurs, it is desirable to limit the current flow through the tube under test to small or zero value to prevent excessive heat formation or storing up thereof in the tube. Consequently, it is arranged that after the transition knee in the waveform across the resistor 20 occurs, a trigger voltage shall be applied to the grid of the second gas filled tube 44 to render the same conductive. When this is effected, the anode of the tube 44 will be at a potential slightly positive relative to its cathode. But since the anode of tube 44 is at the same potential as the grid 14 of the tube 10 under test, the grid 14 will be below the potential of its cathode 16 and the tube 10 will be driven to cutoff or a small value. The grid is below cathode potential when tube 44 is conductive because the cathode 16 is close to ground potential via the tube 18 while the cathode of tube 44 is far below ground potential by a value equal to that of $e_2$.

For the limits $\pi < \omega t < 2\pi$, the voltages are such that the gas filled tubes and the tube under test cannot pass current; therefore the gas filled tube will not again conduct until triggered. If the applied voltage be 60 cycles per second the repetition rates applied to the tubes 18 and 44 should be at some reduced frequency to maintain low tube heat dissipation and the trigger interval between the firing of the two tubes should be about $$\frac{\pi}{8 \times 60}$$

seconds. The cutoff trigger voltage applied to tube 44 at the $\pi/8$ mark may be adjusted slightly one way or the other to bring in more or less of the horizontal portion of the curve. The triggering voltages may be applied by any of the known means of the prior art as for example, by the triggering voltages applied to the "Ignitrons" in Ulrey 2,147,472 or those derived from the delay lines in Labin et al. 2,495,740 or Baracket 2,631,232.

Figure 3:
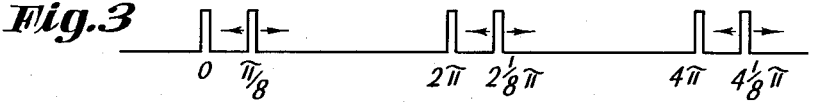
Fig. 3 is a representation of the rate of pulse application to control tubes in the testing instrument.

In Fig. 3 is shown diagrammatically the timing of the pulses applied to tubes 18 and 44 and the adjustability of the trigger pulse applied to tube 44. At the 0, $2\pi$, $4\pi$, ... $2n\pi$ periods the tube 18 will be triggered to render the tube 10 under test conductive, but one-sixteenth of a cycle later, the tube 10 is cut off by firing of the second gas filled tube 44. So for $15/16$ of a cycle the tube under test is not conductive. The repetition rate of triggering the tubes may be at any rate less than the frequency of the supply voltage. Thus if the supply voltage be 60 cycles per second and the repetitive trigger rate be 20 cycles per second and the trigger voltage to tube 18 were supplied at the beginning of a cycle of the A. C. supply, the tube under test would be activated only once out of three cycles of the A. C. supply and then only for one-sixteenth of the A. C. supply cycle.

Figure 4:
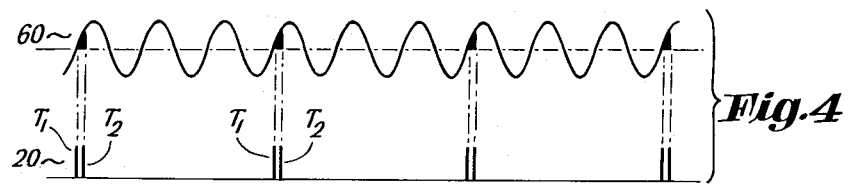
Fig. 4 is a chart showing the relationship of conduction of the tube under test with control pulses.

The relationship of the timing of the supply voltage, the triggering voltage and the periods of conductivity of the tube 10 are illustrated in Fig. 4 wherein the upper curve is the voltage curve of the A. C. supply line, the lower vertical line $T_1$ is the trigger "on" voltage for the grid of tube 18 and the lower vertical line $T_2$ is the trigger "on" voltage for the grid of tube 44. As can be noted from the shaded areas in Fig. 4 representing the times when the tube under test is conducting, the period when the tube under test is conducting is low in relation to the time it is not conducting. Nevertheless the conducting period is long enough to obtain an indication on the indicating or measuring instrument of the emissivity of the tube to and beyond saturation.

It is thus clear that I have provided a measuring instrument which can study the emissive characteristics of a tube to and beyond saturation and yet without injury to the tube.

What I claim as my invention is:

1. In an emission tester for electronic tubes of the type having at least one anode, a grid and a cathode, means for applying to the plate circuit of the tube under test a varying voltage, a resistor in the circuit from across which an indication of the wave form of the varying voltage may be obtained, switch means in the circuit in series with the tube to control initiation of current flow through the tube and through the resistor, and a current flow control means in a grid-cathode circuit of the tube to subsequently substantially cut off the current flow through the tube.

2. In an emission tester for electronic tubes of the type having at least one anode, a grid and a cathode, means for applying to the plate circuit of the tube under test a sinusoidal voltage, a resistor in the circuit from across which an indication of the wave form of the varying voltage may be obtained, a grid controlled gas filled tube in the circuit in series with the tube under test to control initiation of current flow through the tube and through the resistor, and a second grid controlled gas filled tube in a grid-cathode circuit of the tube under test to subsequently substantially cut off the current flow through the tube.

3. In an emission tester for electronic tubes of the type having at least one anode, a grid and a cathode, means for applying to the plate circuit of the tube under test a sinusoidal voltage, a resistor in the circuit from across which an indication of the wave form of the varying voltage may be obtained, a grid controlled gas filled tube in the circuit in series with the tube under test to control initiation of current flow through the tube and through the resistor, and a second grid controlled gas filled tube in a grid-cathode circuit of the tube under test to subsequently substantially cut off the current flow through the tube, the voltages applied to the anodes of the gas filled tubes being in phase.

4. In an emission tester for electronic tubes of the type having at least one anode, a grid and a cathode, means for applying to the plate circuit of the tube under test a sinusoidal voltage, a resistor in the circuit from across which an indication of the wave form of the varying voltage may be obtained, a grid controlled gas filled tube in the circuit in series with the tube under test to control initiation of current flow through the tube and through the resistor, a second grid controlled gas filled tube in a grid-cathode circuit of the tube under test to subsequently substantially cut off the current flow through the tube, and a resistor interposed between the voltage supply and the grid of the tube under test.

5. In an emission tester for electronic tubes of the type having at least one anode, a grid and a cathode, means for applying to the plate circuit of the tube under test a sinusoidal voltage, a resistor and a grid controlled gas filled tube series connected to the tube under test so that current flowing through the tube under test will also flow through the gas filled tube and resistor, a second grid controlled gas filled tube whose anode is connected with the grid of the tube under test and whose cathode is connected to a source of potential lower than that of the cathode of the tube under test, means whereby the first and second gas filled tube may be fired in succession, and means whereby there may be derived from the resistor the wave form of the current passing through the tube under test.

6. In an emission tester for electric tubes of the type having at least one anode, a grid and a cathode, means, including a transformer winding, for applying to the plate circuit of the tube under test a sinusoidal voltage, a resistor and a grid controlled gas filled tube series connected to the tube under test so that current flowing through the tube under test will also flow through the gas filled tube and resistor, a second transformer winding in aiding relation to the first transformer winding, a second grid controlled gas filled tube whose anode is connected with the grid of the tube under test and whose cathode is connected to the otherwise free end of the second transformer winding, means whereby the gas filled tubes may be fired in succession, and means whereby there may be derived from the resistor the wave form of the current passing through the tube under test.

7. In an emission tester for electronic tubes of the type having at least one anode, a grid and a cathode, means, including a transformer winding, for applying to the plate circuit of the tube under test a sinusoidal voltage, a resistor and a grid controlled gas filled tube series connected to the tube under test so that current flowing through the tube under test will also flow through the gas filled tube and resistor, a second transformer winding in aiding relation to the first transformer winding, a second grid controlled gas filled tube whose anode is connected with the grid of the tube under test and whose cathode is connected to the otherwise free end of the second transformer winding, a second resistor between the first transformer winding and the anode of the second gas filled tube, means whereby the gas filled tubes may be fired in succession, and means whereby there may be derived from the resistor the wave form of the current passing through the tube under test.

8. In an emission tester, a transformer winding having across it in series relation a tube under test, a first grid controlled gas filled tube and a first resistor with the grid of the tube under test connected to its anode via a second current limiting resistor, means for affording connection of a measuring instrument with the ends of the first resistor, means for enabling application of a firing potential to the grid of the first gas filled tube, a second transformer winding in aiding relation to the first transformer winding, a second grid controlled gas filled tube whose anode is connected to the grid of the tube under test and whose cathode is connected to the otherwise free end of the second transformer winding, and means for enabling subsequent application of a firing potential to the grid of the second gas filled tube.

References Cited in the file of this patent

UNITED STATES PATENTS

| Re. 18,641 | Goodwin | Nov. 1, 1932 |
| 1,805,074 | Burtch | May 12, 1931 |
| 2,033,347 | Manly | Mar. 10, 1936 |